Sept. 4, 1945.　　　　F. E. WOLCOTT　　　　2,384,359
SEAL FOR VACUUM TYPE COFFEE MAKERS
Filed July 18, 1942
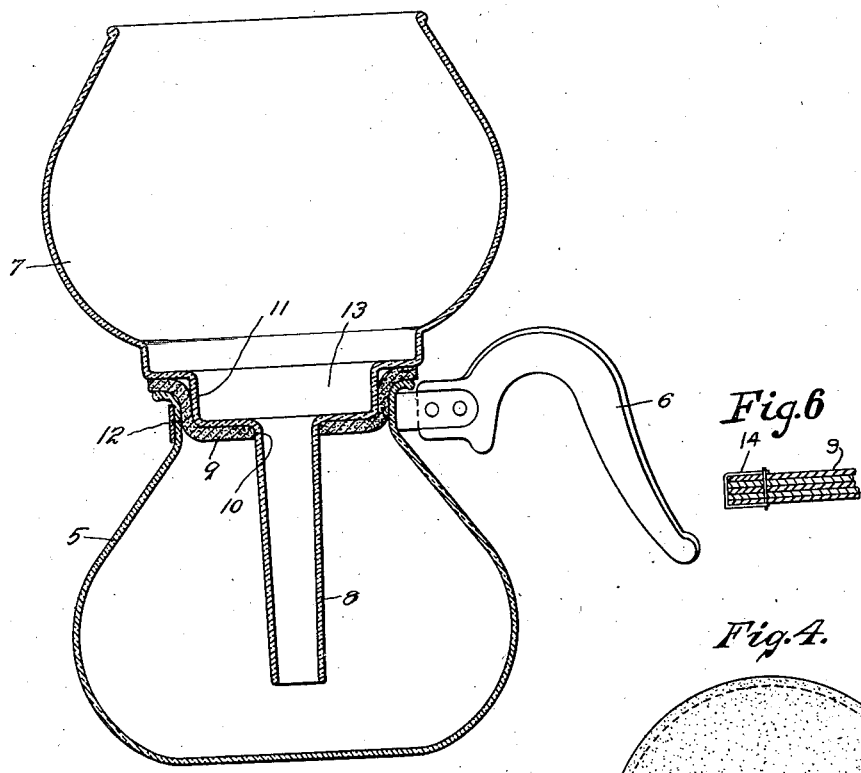
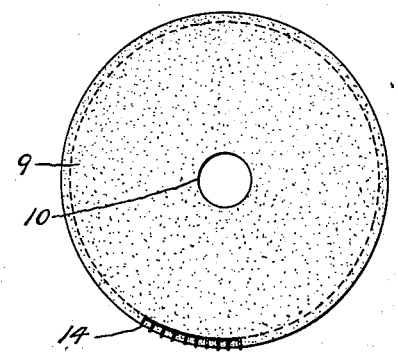
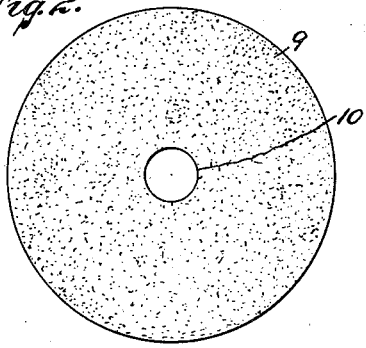
INVENTOR.
FRANK E. WOLCOTT
BY
Louis V. Lucia
ATTORNEY.

Patented Sept. 4, 1945

2,384,359

UNITED STATES PATENT OFFICE 2,384,359

SEAL FOR VACUUM TYPE COFFEE MAKERS

Frank E. Wolcott, West Hartford, Conn., assignor to The Silex Company, Hartford, Conn.

Application July 18, 1942, Serial No. 451,428

2 Claims. (Cl. 99—292)

This invention relates to coffee makers of the vacuum type and has for an object thereof to provide a seal for such coffee makers which is economical to produce.

A further object is to provide such a seal which will replace those now commonly being made of rubber.

A still further object of this invention is to provide a seal for coffee makers which can be easily produced in different thicknesses so as to accommodate any variation in size of the space in a coffee maker for which the seal is intended.

Further objects and advantages of my invention will be more clearly understood from the following description and from the accompanying drawing in which—

Fig. 1 is a view in central vertical section, of a vacuum type glass coffee maker including a seal embodying this invention.

Fig. 2 is a plan, in elevation, of said seal in its normal shape.

Fig. 3 is an edge view thereof.

Fig. 4 is a plan view, in elevation, of a modified form of seal embodying my invention.

Fig. 5 is a view in central vertical section through the same.

Fig. 6 is an enlarged fragmentary view, in central vertical section, of the edge portion of the seal as shown in Fig. 5.

As illustrated in the drawing, the numeral 5 denotes the lower bowl of a coffee maker which has a handle 6 connected thereto and the numeral 7 denotes an upper bowl which is mounted upon the said lower bowl and has a depending stem 8 extending thereinto.

In vacuum type coffee makers, it is necessary that the space between the neck of the lower bowl and the portion of the upper bowl which extends therethrough be sealed in order to prevent the escape of pressure which is generated in the lower bowl, when water is heated therein, and thereby cause said pressure to force the water up through the stem 8 into the upper bowl where it will permeate coffee grounds that are contained therein. When heat is then removed from the coffee maker, a vacuum will be created in the lower bowl which will draw the liquid through a filter, not shown, back into the lower bowl as coffee.

The seal provided by my present invention may be produced in the form of a disk 9 having a central opening 10 to receive the stem 8 and be centered thereby on the upper bowl. This seal may be constructed from a flat sheet of any suitable material which can be produced in the required thickness and which is flexible and resilient so that it may be forced into the position illustrated in Fig. 1 to provide a suitable seal between the upper and lower bowls.

In the embodiment shown, the upper bowl is preferably formed with a depending portion having an annular wall 11 which extends into the neck of the lower bowl and provides an abutment for the seal 9 that will force it into contact with the inner surface of the neck 12 of the lower bowl.

The said wall 11 will also provide a depression 13, at the bottom of the upper bowl, in which a filter of conventional form may be located.

My improved seal is of particular advantage since it may be produced as a flat disk, as illustrated in Figs. 2 and 3, which can be attached to the upper bowl by simply inserting the stem 8 through the central opening of the seal and moving the seal up on the stem until it engages the bottom of the depending portion 11. The said stem will then centralize the seal so that it will project laterally beyond the wall 11 and evenly around said wall. The upper bowl is then simply placed upon the lower bowl and the seal is brought into contact with the top of the lower bowl and forced downwardly; thus causing the seal to be squeezed between the wall 11 and the surface of the neck of the lower bowl and thereby providing the required sealing effect.

Heretofore, seals have been provided, between such upper and lower bowls, which have usually been of molded rubber and therefore could not have been economically produced in different sizes so as to accommodate differences in the clearances between different upper and lower bowls.

In the modified form of the seal illustrated in Figs. 4 and 5, the same may be constructed of sheets of flexible material, such as a suitable fabric or the like, which is preferably bound together by an overedge stitching as indicated at 14. In this form, the seal may be provided of different desired thicknesses to properly seal a certain space between the wall 11 and the surface 12 in the coffee maker by simply using the different numbers of layers which may be required.

I claim:

1. In a coffee maker comprising a lower bowl and an upper bowl having a stem depending therefrom into said lower bowl, a seal comprising a sheet of flexible fabric material positioned between said upper and lower bowls and having a central opening therein closely fitting said stem.

2. In a coffee maker comprising a lower bowl having a neck, an upper bowl having a depending portion fitting within said neck, and a stem depending from said portion into said lower bowl; the combination of a seal comprising a normally flat disk of flexible material having a central opening through which said stem projects; the said seal extending beyond the periphery of said depending portion whereby, upon forcing of the upper bowl into the lower bowl, the said disk will extend from said stem laterally along the bottom of the depending portion of the upper bowl, vertically between the sides of said depending portion and the neck of the lower bowl, and laterally between the top of the lower bowl and the bottom of the upper bowl.

FRANK E. WOLCOTT.